United States Patent [19]
Green

[11] 4,252,271
[45] Feb. 24, 1981

[54] HEAVY EQUIPMENT HEATING SYSTEM
[76] Inventor: William R. Green, #1, Box 283, Pleasant Shade, Tenn. 37145
[21] Appl. No.: 53,434
[22] Filed: Jun. 29, 1979
[51] Int. Cl.³ .............................................. B60H 1/02
[52] U.S. Cl. ................................ 237/12.3 A; 98/2.05; 98/2.11
[58] Field of Search ............. 237/12.3 A, 2 A, 12.3 B; 98/2.05, 2.11, 2.06, 2.12; 165/43, 41; 123/142.5

[56]  References Cited
U.S. PATENT DOCUMENTS

| 1,446,725 | 2/1923 | Shamberg | 237/12.3 A |
| 1,875,637 | 9/1932 | Modine | 237/12.3 A |
| 1,907,883 | 2/1929 | Scott | 237/12.3 A |
| 2,920,829 | 1/1960 | Shane | 237/12.3 A |
| 4,093,119 | 6/1978 | Swisher | 237/12.3 A |

FOREIGN PATENT DOCUMENTS 805232 3/1951 Fed. Rep. of Germany ..... 237/12.3 A
654220 6/1951 United Kingdom ............... 237/12.3 A Primary Examiner—Albert J. Makay
Assistant Examiner—Henry Bennett
Attorney, Agent, or Firm—Thomas E. Beall, Jr.

[57] ABSTRACT

A heater for heavy construction equipment is provided by three basic components: a hood mounted over the outer end of the normal vehicle radiator for receiving the cooling air blown through the radiator and directing it in the reverse direction towards the operator; a distribution hood having manually controlled and indexible distribution flaps on its discharge and a manually controlled and indexed shutoff valve on its intake for receiving heated air and distributing it to the operator's head, body and feet, selectively, with one of the flaps being transparent so as to permit viewing through it of the instrument panel; and a flexible conduit extending between the hood outlet and the distribution housing inlet, and overlying the vehicle engine.

8 Claims, 6 Drawing Figures

HEAVY EQUIPMENT HEATING SYSTEM

BACKGROUND OF THE INVENTION

The present invention related to vehicle heaters.

Vehicle heaters are well known as aftermarket or original equipment.

With respect to heavy construction equipment, such equipment has normally only been provided with heaters, when it is at the same time provided with an enclosing cab for the operator. There are many times when it is required, or desirable, to not have an enclosing cab for the operator, so that the operator may more readily view the works of and be in closer communication with the operator's environment. When no cab is provided, the operator can experience extreme discomfort by being exposed to the elements, and there is no satisfactory solution for protecting such an operator, other than the relatively unsatisfactory provision of more clothing. Heavy construction equipment can be provided with a removable cab or partial closures, with respect to the environment, for the operator. During extreme winter conditions, it is desirable to provide such a cab, which is then removed during hot weather. There is no satisfactory protection during the intermediate stages when it can be uncomfortably cold for the operator on one day and too hot for the operator on another day so that normally the cab is removed during this time and the operator suffers during the colder periods.

SUMMARY

It is an object of the present invention to provide a heater structure that may be added onto existing heavy construction equipment, or perhaps as original equipment. The heater is easily constructed, of cheap construction, and easily installed.

The heater is of a basic three part construction, comprising: a hood mounted over the outer end of the normal vehicle radiator for receiving the cooling air blown through the radiator and directing it in the reverse direction towards the operator; a distribution hood having manually controlled and indexible distribution flaps on its discharge and a manually controlled and indexed shutoff valve on its intake for receiving heated air and distributing it to the operator's head, body and feet, selectively, with one of the flaps being transparent so as to permit viewing through it of the instrument panel; and a flexible conduit extending between the hood outlet and the distribution housing inlet, and overlying the vehicle engine.

With such a simple construction, the heater may be easily removed when not needed, repaired, installed, and adapted to different equipment. Further, the heater will not obstruct the operator's view materially while at the same time providing a controllable flow of heated air about and on the operator's entire body.

BRIEF DESCRIPTION OF THE DRAWING

Further objects, features and advantages of the present invention will become more clear from the following Detailed Description of a Preferred Embodiment of the invention, as more fully shown in the accompanying drawing, wherein.

Figure 1:
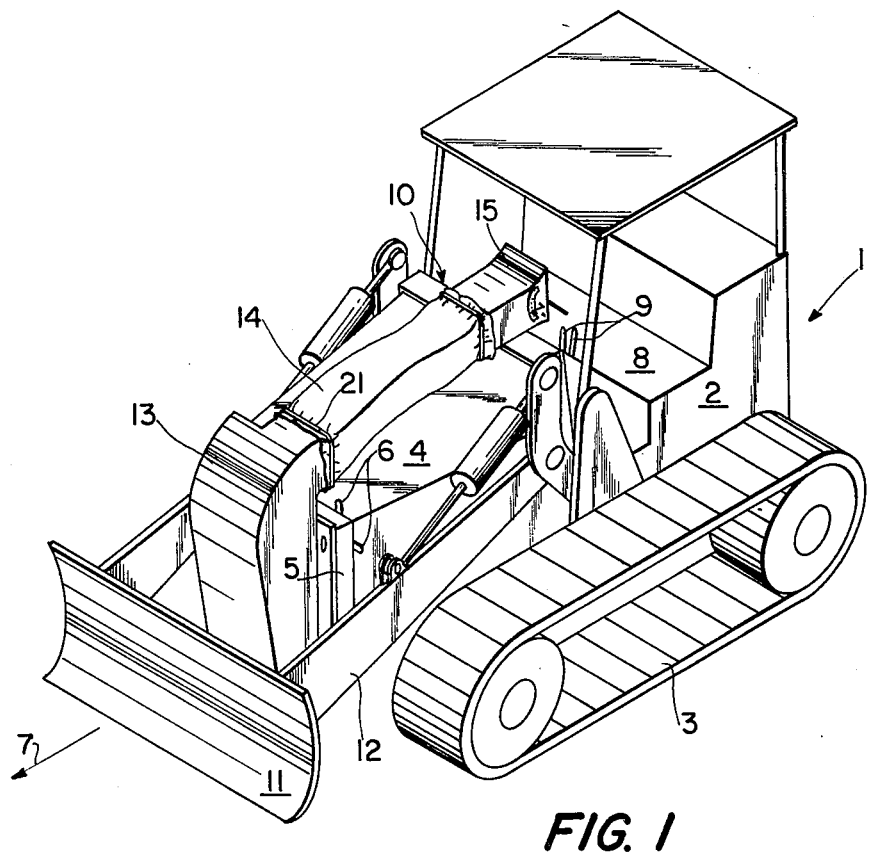
FIG. 1 is a view of the heater of the present invention as it appears installed on a heavy construction vehicle.

The present invention is to be used in combination with a conventional piece of heavy equipment, particularly with heavy construction equipment, particularly as an after market add-on device. By way of specific example, the heavy construction equipment illustrated in FIG. 1 may be of the type known as a bulldozer or highlift. The conventional vehicle 1 includes a body 2, wheel substitutes 3 in the nature of caterpillar treads, an internal combustion engine 4 of the water cooled variety having a radiator 5, a fan 6 driven by the engine 4 for moving air through the radiator 6 in an air flow direction that corresponds to the vehicle driving direction 7, an operator seat 8, manual controls 9 for controlling the engine 4 and its driving connection to the wheel substitutes 3 so as to control the motion of the vehicle, an instrument board 10 located adjacent the operator seat 8 and containing conventional instruments such as fuel gauge, oil pressure, tachometer, etc., an earth moving blade 11, and mechanism 12 for mounting and controlling the blade 11 with respect to the remainder of the vehicle.

According to the present invention, a hood 13 is mounted on the forward side of the radiator 5 so as to receive the heated air that is passed through the radiator 5 by operation of the fan 6. A flexible conduit 14 receives the heated air from the hood 13 and moves it rearwardly across the top of the engine 4 in the direction towards the operator seat 8. A distribution housing 15 receives the heated air from the flexible conduit 14 and distributes it towards the operator seated in the operator seat in a normal operating upright position.

Figure 2:
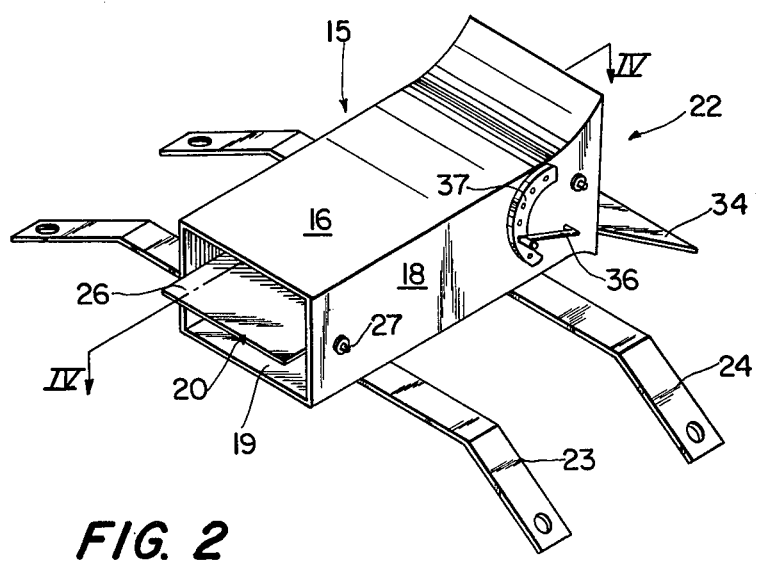
FIG. 2 is a perspective view, on an enlarged scale, of the distribution housing as it appears in FIG. 1.
Figure 3:
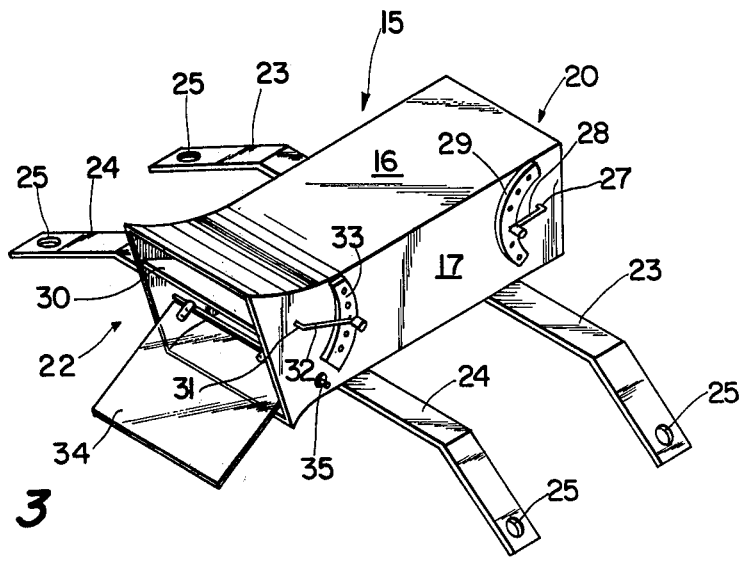
FIG. 3 is a perspective view, taken from the opposite end, of the distribution housing of FIG. 2.
Figure 4:
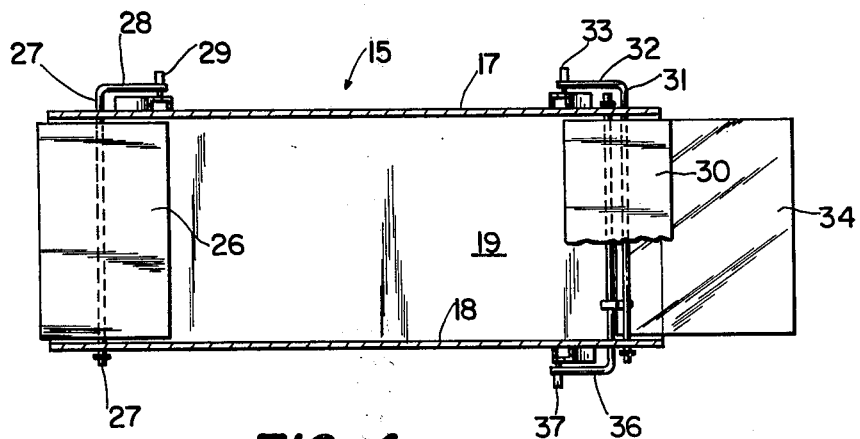
FIG. 4 is a plan view, in cross section and with portions broken away, taken along line IV—IV of FIG. 2.

In FIGS. 2–4, the distribution housing is shown in more detail.

The distribution housing is fabricated of welded sheet steel so as to have a top wall 16, side walls 17, 18, and a bottom wall 19, defining together an inlet coupling 20 telescopically connected to the flexible conduit 14 with a peripheral clamping wire, belt or the like 21 (shown in FIG. 2), and a discharge opening 22 that defines a discharge direction for the heated air towards the operator seat 8. Metal straps 23 and 24 are welded to the bottom wall 19 and extend laterally, with respect to the driving direction 7, outwardly for connection by means of bolts (not shown) that will pass through holes 25 for securement to the vehicle 1.

For control of the air passing through the distribution housing, there is provided a shut-off valve 26, which is in the nature of a rectangular plate butterfly valve 26 mounted on an axle 27 pivotally mounted in the side walls 17, 18 and provided with a crank arm 28 that may be manually moved so as to move the valve 26 between a fully closed vertical position and a fully opened horizontal position that is shown in FIG. 2. An indexing mechanism comprising a plurality of arcuately arranged apertures in the side wall 17 and a spring urged detent at the outer end of the handle 28 is provided to lock the valve 26 in its fully opened position, its fully closed position, and intermediate positions.

Within the discharge opening, there is mounted an air distribution flap 30, provided with axle 31, handle 32, indexing mechanism 33, corresponding to the similarly named parts for valve 26 that operate in a similar manner except that the flap 30, in its vertical position, only partially closes the discharge opening. The shut-off valve 26 will control the amount of air flowing through the distribution housing, while the air distribution flap 30 will control the direction of the air discharge passing through the top of the discharge opening.

Mounted substantially beneath and parallel to the flap 30, there is an air guide flap 34 having axle 35, handle 36, and indexing means 37 that operate in the same manner as and are constructed similarly to the correspondingly named parts of the flap 30, for controlling the direction of air flow through the lower portion of the discharge opening. Thus, the air passing through the distribution housing is split into two parallel flows, respectively having their directions of discharge controlled by the flaps 30 and 34 so that they may be independently varied within a range of angles within a common plane containing therein the operator seat 8. Thus, the flap 30 will direct air towards the head of the operator whereas the flap 34 will direct air towards the lower body portion of the operator, including the operator's feet.

The flap 34 is elongated and will extend downwardly so as to provide heated air towards the feet and lower body portions of the operator, and thus lies in a position between the normal high position of an average size operator sitting upright in operating position on the seat 8 and the instrument board 10. To prevent blocking the view of the operator of the instruments on the instrument board, the flap 34 is constructed of a transparent material, such as tempered glass or a transparent relatively rigid synthetic resin.

Figure 5:
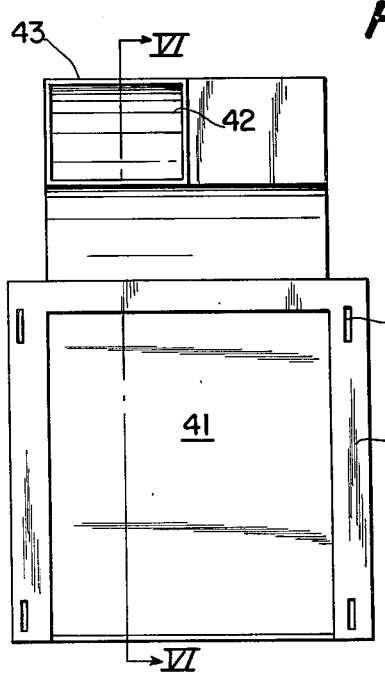
FIG. 5 is a rear elevation view of the hood.
Figure 6:
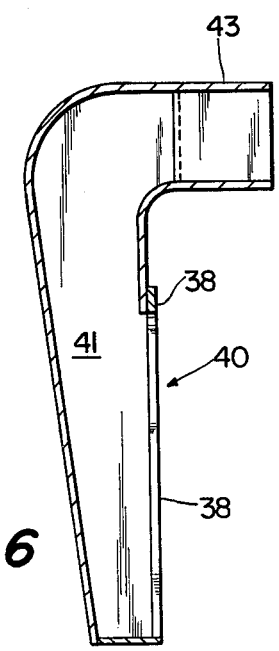
FIG. 6 is a cross sectional view taken along line VI—VI of FIG. 5.

As shown more clearly in FIGS. 5 and 6, the hood includes a mounting flange 38 having slots 39 for receiving bolts (not shown) to secure the hood to the front of the radiator 5 and form an inlet 40 to a wedge shaped hood chamber 41. The hood is provided with an outlet opening 42 formed by a rectangular coupling conduit portion 43 that is telescopically connected to the flexible conduit 14 in a manner to that previously described with respect to the connection between the same conduit and the distribution housing. The hood is fabricated of welded steel plate.

The flexible conduit is preferably constructed of canvas, or tubular flexible synthetic resin, either of which may have a wire support (not shown).

While a preferred embodiment of the present invention has been specifically described, for the advantages of the details and for purposes of illustrations, further embodiments, variations and modifications are contemplated, all within the spirit and scope of the following claims.

What is claimed is:

1. A heater in combination with a vehicle having a body supported by wheels or wheel substitutes to define a driving direction, a water cooled combustion engine drivingly connected to the wheels or wheel substitutes for powering the vehicle, a radiator providing substantially all of the cooling for the cooling water of the engine, a fan for moving air in heat exchange relationship through the radiator and exhausting the same in an air flow direction, an operator seat, a plurality of engine and vehicle controls located within manual reach of said operator seat and operatively connected to the engine and vehicle for control of the same, and an instrument board located adjacent said operator seat, wherein the improvement is in said heater, comprising:

a hood having means for securing it to the radiator so as to receive the air blown through the radiator in the air flow direction, having a hood chamber for collecting the received air, and having an outlet opening into said chamber for passing heated air within said chamber outwardly;

a distribution housing having connecting means for securing it to the vehicle adjacent the instrument board and operator seat, having an inlet coupling, a housing chamber fluid connected to said inlet coupling and a discharge opening fluid connected to said housing chamber so that air flowing through said inlet coupling into said housing chamber will pass out of said discharge opening;

said connecting means providing a fixed orientation of said distribution housing with respect to said vehicle so that said discharge opening defines an air discharge direction towards the operator seat;

a conduit having opposed ends, one of said ends having coupling means for fluid connecting it to said distribution housing inlet coupling, and the other of said ends having coupling means for fluid connecting it to said outlet of said hood for conducting heated air that is passed through the heat exchanger and through the hood to the distribution housing so that it may be discharged towards the operator seat;

a shut-off valve mounted within said distribution housing so as to be movable between a fully opened position freely permitting passage of heated air from said housing inlet coupling to said housing discharge opening and a fully closed position substantially preventing passage of air from said housing inlet coupling to said housing discharge opening;

said distribution housing including an air distribution flap mounted in said housing discharge opening and movable so as to change the direction of air being discharged from said discharge opening;

an air guide flap mounted below said air distribution flap and independently movable between positions for changing the direction of air passing through it, and said flaps being mounted and movable so that the air passing through said discharge opening is split in parallel paths respectively passing through said two flaps and respectively controlled over an angular range of discharge directions within a common plane passing through said operator seat; and said air guide flap being constructed of a transparent sheet interposed between the instrument board and a fixed position spaced above the operator seat corresponding to the normal eye position of an average operator sitting upright in said operator seat and said air guide flap being movable so as to direct air flow downwardly towards the normal foot position of the operator.

2. The apparatus of claim 1, wherein said hood and housing are fabricated from welded steel plate.

3. The apparatus of claim 1, wherein said engine is between said radiator and said operator seat;

said air flow direction is the same as said driving direction; and said hood outlet opens outwardly, with respect to the hood chamber, in substantially the opposite direction to said driving direction and is spaced above said radiator;

said distribution housing inlet coupling opens outwardly, with respect to the housing chamber, in the driving direction and away from said operator seat;

said conduit is manually flexible and extends entirely along the top of said engine; and said hood is of a size with respect to the radiator so as to receive substantially all of the air passing through the radiator.

4. The apparatus of claim 1, further including a manually operatable handle movably mounted on said housing and drivingly connected to said shut-off valve for manual movement of said shut-off valve between said positions, indexing means for locking said shut-off valve in said two positions and additional positions intermediate said fully opened and fully closed positions, and indexing means locking said distribution flap in a selected position.

5. The apparatus of claim 3, wherein said hood and housing are fabricated from welded steel plate.

6. The apparatus of claim 5, further including a manually operatable handle movably mounted on said housing and drivingly connected to said shut-off valve for manual movement of said shut-off valve between said positions, indexing means for locking said shut-off valve in said two positions and additional positions intermediate said fully opened and fully closed positions, and indexing means locking said air distribution flap in a selected position.

7. The apparatus of claim 6, wherein said shut-off valve is mounted within said housing inlet coupling, said air distribution flap and said air guide flap being mounted for rotation about generally parallel horizontal axes within said discharge opening, said distribution housing being tubular, indexing means locking said air guide flap in a selected position, and each of said indexing means including a shaft pivotally mounted in said tubular housing, being drivingly secured to its respective flap or valve, having an extension passing through the side wall of said housing to form a crank portion angularly related to its pivot axis and having a spring urged detent at the outer end of the crank, and an arcuate array of apertures sequentially in alignment with said detent in a plurality of pivoted positions of said shaft.

8. The apparatus of claim 4, wherein said hood and housing are fabricated from welded steel plate.

* * * * *